Feb. 6, 1968

R. L. TABOR ET AL 3,367,197

TRANSFER APPARATUS

Filed July 19, 1965

INVENTORS
RALPH L. TABOR
WALTER GREENWOOD
BY PETER J. MANETTA
Whittemore, Hulbert
& Belknap
ATTORNEYS Feb. 6, 1968  R. L. TABOR ET AL  3,367,197

TRANSFER APPARATUS

Filed July 19, 1965  7 Sheets-Sheet 5

INVENTORS
RALPH L. TABOR
WALTER GREENWOOD
BY PETER J. MANETTA
Whittemore Hulbert
& Belknap
ATTORNEYS

United States Patent Office 3,367,197
Patented Feb. 6, 1968

3,367,197
TRANSFER APPARATUS
Ralph L. Tabor, Birmingham, Walter Greenwood, Dearborn, and Peter J. Manetta, East Detroit, Mich., assignors to Simplex Corporation, Detroit, Mich., a corporation of Michigan
Filed July 19, 1965, Ser. No. 472,814
18 Claims. (Cl. 74—110)

ABSTRACT OF THE DISCLOSURE

Transfer apparatus comprising a vertically movable platform, a slide movable vertically with and horizontally on the platform, and drive means for producing essentially harmonic motion of the platform vertically and of the slide horizontally.

---

The present invention relates to transfer apparatus, and more particularly to a transfer apparatus having horizontal and vertical components of motion both of which are harmonic in character.

It is an object of the present invention to provide transfer apparatus operable to effect lifting and horizontal transfer of devices in a smooth vibration-free operation.

It is a further object of the present invention to provide transfer apparatus in which movement is effected having horizontal and vertical components, each of the components being independently adjustable while maintaining throughout adjustment its harmonic character.

More specifically, it is an object of the present invention to provide transfer apparatus comprising a platform, a plurality of posts supporting the platform, and means interconnecting the posts for moving the posts vertically with a harmonic motion.

It is a further object of the present invention to provide a platform which is vertically movable as for example as described in the preceding paragraph, and a slide mounted on the platform for vertical movement therewith and for horizontal movement relative thereto, and means for effecting back and forth sliding movement of the slide on the platform which is essentially harmonic in character and which is fully independent of the vertical movement of the platform.

More specifically, it is an object of the present invention to provide a platform, four posts supporting the platform for vertical movement, each of the posts including a rack section, pinions engageable with each of the rack sections, and means for effecting simultaneous rotational movement of all of the pinions in such a way as to produce vertical movement of the platform which is simple harmonic in character.

It is a further object of the present invention to provide a platform vertically movable as for example as described in the preceding paragraph, in combination with a slide movable horizontally on the platform, adjustable lever means connected to the slide through a pin and slot connection, and eccentric rotatable means for rocking the lever so as to obtain horizontal sliding movement of the slide relative to the platform which is essentially harmonic in character.

Other objects and features of the invention will become apparent as the description proceeds, especially when taken in conjunction with the accompanying drawings, illustrating a preferred embodiment of the invention, wherein.

Figure 1:
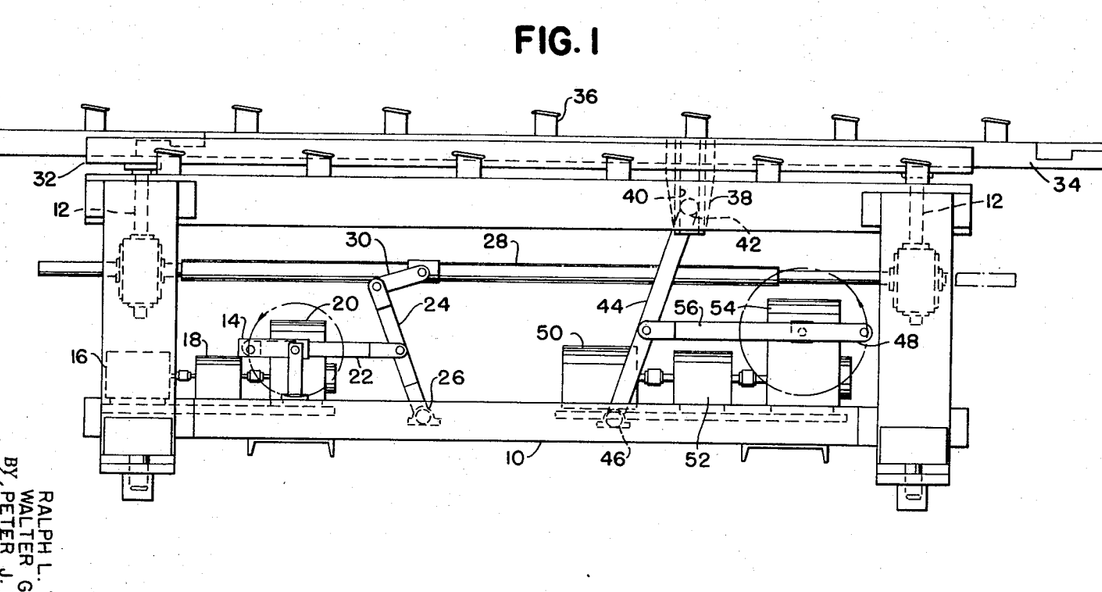
FIGURE 1 is an elevational view of simplified mechanism illustrating the motions provided by the transfer apparatus of the present invention.

Referring first to FIGURE 1 there is illustrated a simplified version of the transfer apparatus. This simplified version is presented merely to illustrate the motions which are obtained by the more completely engineered and designed components fully illustrated in FIGURES 2–10.

Referring first to FIGURE 1 however, there is shown a frame 10 including vertically movable posts 12 adapted to be moved vertically in synchronism by mechanism which includes a crank 14 driven from a motor 16 through a combined brake clutch unit 18 and a speed reducer 20 connected through a link or connecting rod 22 to a lever 24 which is pivoted to the frame 10 as indicated at 26 and which is connected to a longitudinal bar 28 through a link 30. The bar 28 at its opposite ends contains rack teeth which are not shown in the figure but which are adapted to engage pinions carried by a cross shaft at either end of the frame 10. Each of the cross shafts carries a pinion which is in mesh with rack teeth on the posts 12.

At the upper end of the posts 12 there is provided a platform 32 which is movable as a result of the vertical movement of the posts 12. Since the movement of the posts 12 derives from rotation of the crank 14 through the linkage illustrated, it will be appreciated that the vertical movement of the posts 12 and hence of the platform 32 is harmonic in character.

Horizontally slidable on the platform 32 is a table or slide 34 having work supporting structures 36 thereon. The slide 34 includes a depending bracket 38 having a vertical slot 40 therein which receives a pin or roller means indicated at 42 carried at the upper end of a lever 44 which is pivoted at its lower end as indicated at 46 to the frame 10. The lever 44 is driven from a crank 48 driven from a motor 50 through a combined clutch and brake unit 52 and a speed reducer 54. The crank 48 is connected to the lever 44 through a link or connecting rod 56. It will be apparent that rotation of the crank effects a harmonic back and forth oscillation of the lever 44 and this is imparted through the pin and slot connection 42, 40 to the slide 34.

In the operation the combined clutch and brake devices are of the character adapted when electrical connections are made or broken to connect or disconnect a clutch and simultaneously therewith to release or apply a brake. The result is that the movement of the cranks 14 and 48 are abruptly started and stopped and suitable switch means are provided to effect appropriate timing to produce the required movement of the slide 34. Thus, in a typical operation completion of vertically upward movement of the platform 32 disconnects the clutch in the vertical drive and initiates horizontal movement of the slide in one direction. Completion of the horizontal movement of the slide in the aforesaid direction results in disconnection of the horizontal traverse mechanism and initiation of the downward movement of the platform. Completion of the downward movement of the platform results in disengagement of the vertical drive mechanism and initiation of movement of the slide in the opposite direction. Completion of the horizontal movement of the slide in the opposite direction results in disengagement of the horizontal drive mechanism, ending a cycle. With the foregoing cycle arrangement the slide 34 moves vertically upwardly, thereafter horizontally a predetermined distance, thereafter vertically downwardly, and finally, horizontally to its starting position. It will of course be apparent that the horizontal movement of the slide relative to the platform may be initiated prior to completion of the upward movement of the platform, and similarly, vertical movement of the platform may be initiated prior to completion of horizontal movement of the slide. With this arrangement the platform 34 may move in a generally rectangular path which however, includes rounded corners, and since the horizontal and vertical feed mechanisms are fully independent, the actual path of movement of the slide may be substantially modified as for example to include rounded corners of substantial radius at the top or bottom of the closed path which it traverses, and rounded corners of different radius at the remaining corners.

Due to the harmonic nature of the motion, shocks and vibration are completely avoided and it is found that the entire mechanism, which may be quite large and rugged in character, is astonishingly free from noise and vibration in use.

Referring now to FIGURES 2–10 there is illustrated a fully engineered adjustable transfer apparatus embodying the basic principles described in conjunction with FIGURE 1.

Referring first to FIGURES 2, 4, 6 and 7 there is illustrated particularly the mechanism which effects horizontal movement. In these figures the frame 100 includes corner posts 102 each of which is provided with a leveling screw 104 having a foot 106 adapted to rest on the floor so that the entire transfer apparatus may be leveled and adjusted as required.

Figure 6:
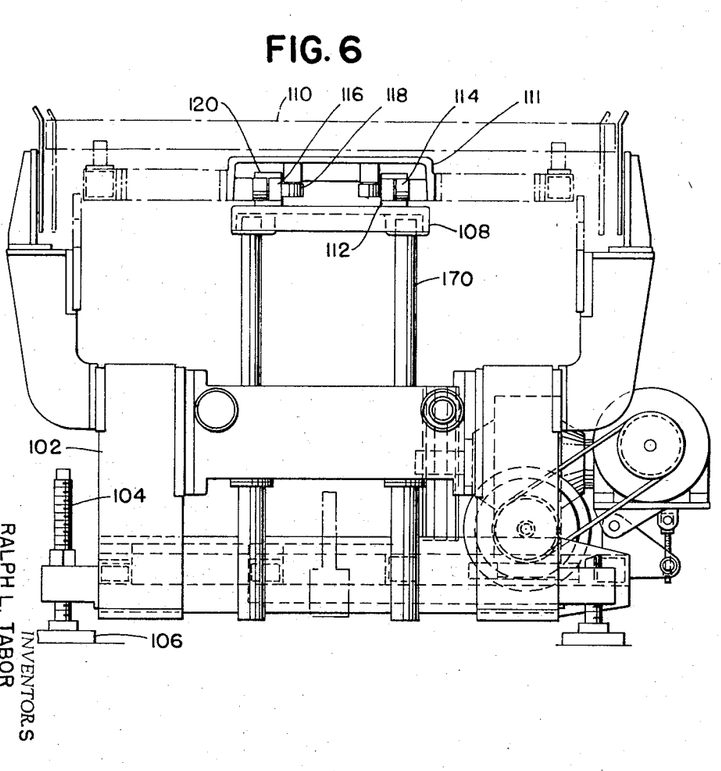
FIGURE 6 is an end view of the transfer apparatus.

A platform 108 is provided and is vertically movable on the frame 100 by mechanism later to be described. Longitudinally movable on the platform 108 is a slide 110 including a saddle member 111. As best seen in FIGURE 6, the platform 108 contains tracks 112 on which rollers 114 carried by the saddle member 111 are adapted to roll. On the tracks 112 are upstanding rails 116 two of these being provided in parallel relationship. The saddle member 111 carries guide rollers 118 which bear against the inner confronting surfaces of the rails 116. Preferably, strips 120 connected to the rails 116 overlie the rollers 114.

Figure 4:
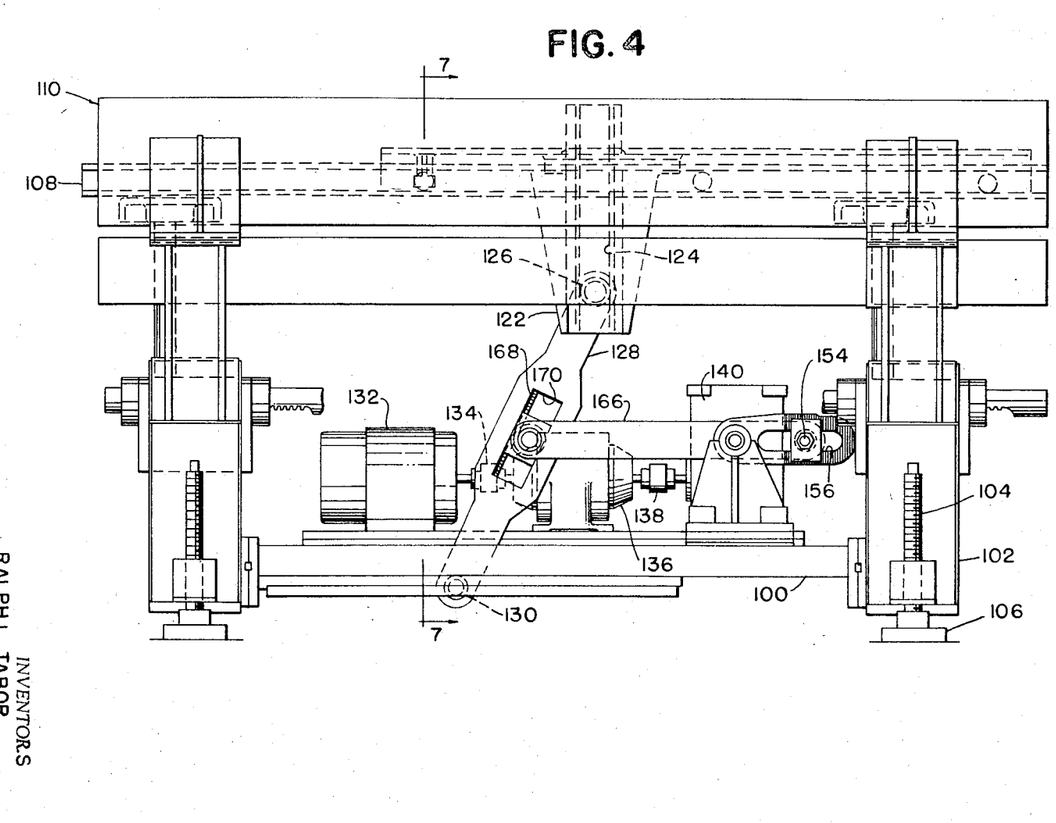
FIGURE 4 is a side elevational view of the transfer apparatus illustrating particularly the mechanism for effecting horizontal movement.
Figure 7:
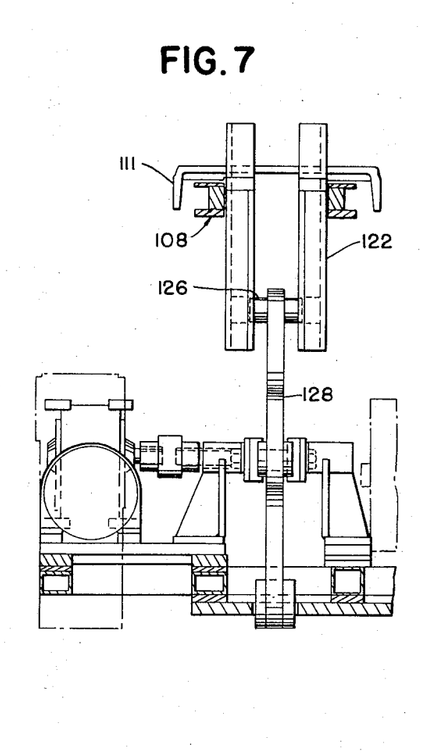
FIGURE 7 is a fragmentary sectional view on the line 7—7 of FIGURES 4 and 5.

As best seen in FIGURES 4 and 7, the slide 110 is provided with a pair of depending brackets 122 having vertical confronting grooves or channels 124 adapted to receive a follower 126 carried at the upper end of a lever 128 the lower end of which is pivoted to the frame 100 as indicated at 130.

A motor 132 is mounted on the frame and its drive shaft is connected by a coupler 134 to a combined electrically operated brake and clutch unit 136 which may be of the type sold under the trade name "Cycledyne." This device includes a clutch and brake and is adapted when the electrical energization is altered to selectively and substantially simultaneously disengage the clutch and apply the brake to bring driven mechanism to an abrupt halt. Opposite energization results in release of the brake and substantially simultaneous engagement of the clutch to effect continued rotation of its output shaft. The combined clutch-brake unit 136 is connected through a coupler 138 to a suitable speed reducer 140 having an output shaft 142 connected to a crank 144 having a crank arm 146. A second crank 148 having a crank arm 150 is journaled in a bearing 152. The crank arms 146 and 150 are interconnected by a pin 154 extending through elongated openings 156 therein. Means are provided for adjusting the throw of the crank arms 146 and 150 and this includes serrated surfaces 160 on the crank arms, serrated washers 162, and threaded clamping means indicated at 164. By this means the radial distance of the driving pin 154 from the axis of the drive shaft 142 may be adjusted.

The drive pin 154 is received in an opening at the end of the connecting rod 166, the opposite end of which is connected to a block 168 adjustable in an elongated opening 170 provided in the lever 128. With this arrangement the amount of movement of the slide 110 may be adjusted, first by adjusting the effective radius of the crank arm and secondly, by adjusting the point of connection between the connecting rod 166 and the lever 128.

Referring now more particularly to FIGURES 2, 3 and 5–10, the mechanism for effecting vertical movement of the platform 108 is illustrated. The platform 108 is provided at each end thereof with a pair of vertically extending posts 170 which are provided along one side thereof with rack teeth as indicated at 172 in FIGURE 10. A housing 174 is provided at each end of the apparatus and includes a cross shaft 176 having a pair of drive pinions 178 affixed thereto, each in mesh with the rack teeth 172 of one of the posts 170. In order to effect simultaneous equal vertical movement of all four of the posts, longitudinally reciprocable drive means are provided including at each end a rack 180 in mesh with a pinion 182 fixed to the cross shaft 176.

Figure 8:
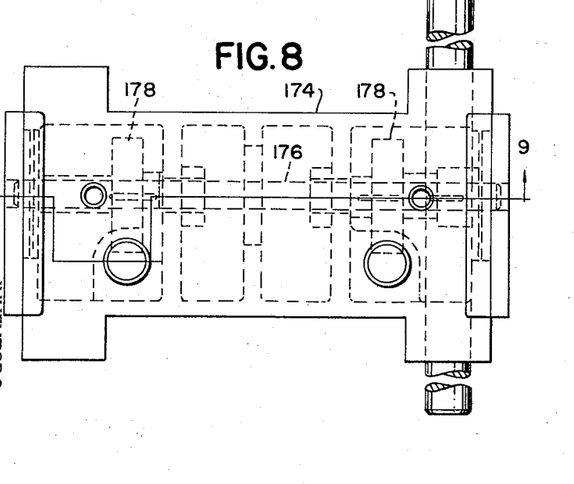
FIGURE 8 is a plan view of the gear box for the vertical drive mechanism.
Figure 9:
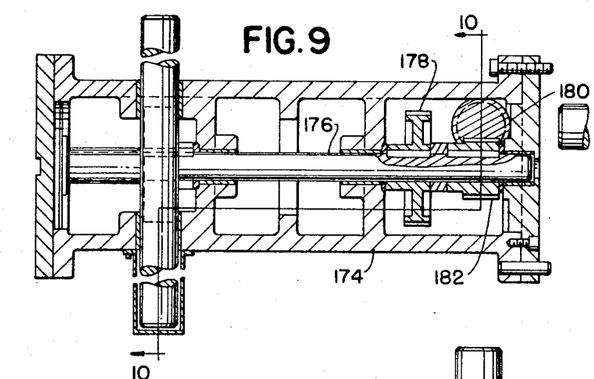
FIGURE 9 is a sectional view on the line 9—9, FIGURE 8.
Figure 10:
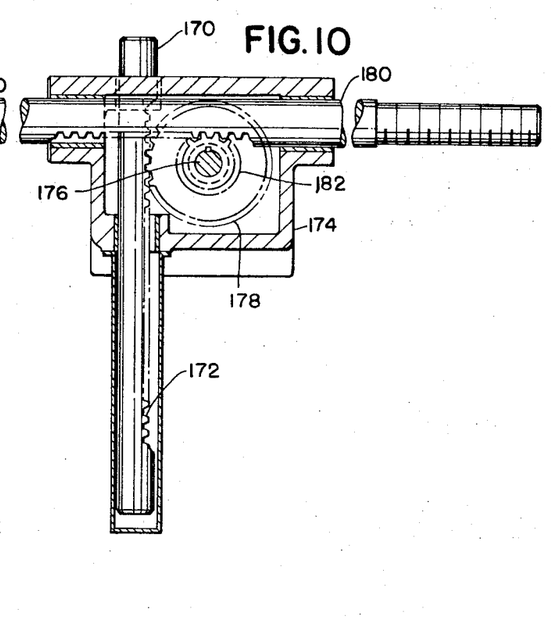
FIGURE 10 is a sectional view on the line 10—10, FIGURE 9.

The longitudinally reciprocable drive means includes a yoke 184 having laterally offset sleeve portions 186 which receive the threaded ends 188 of the rack sections 180. Individual adjustment of the rack sections relative to the yoke 184 is accomplished by lock nuts 190 and 192 threaded on the section 188 of the racks 180.

Figures 2, 3:
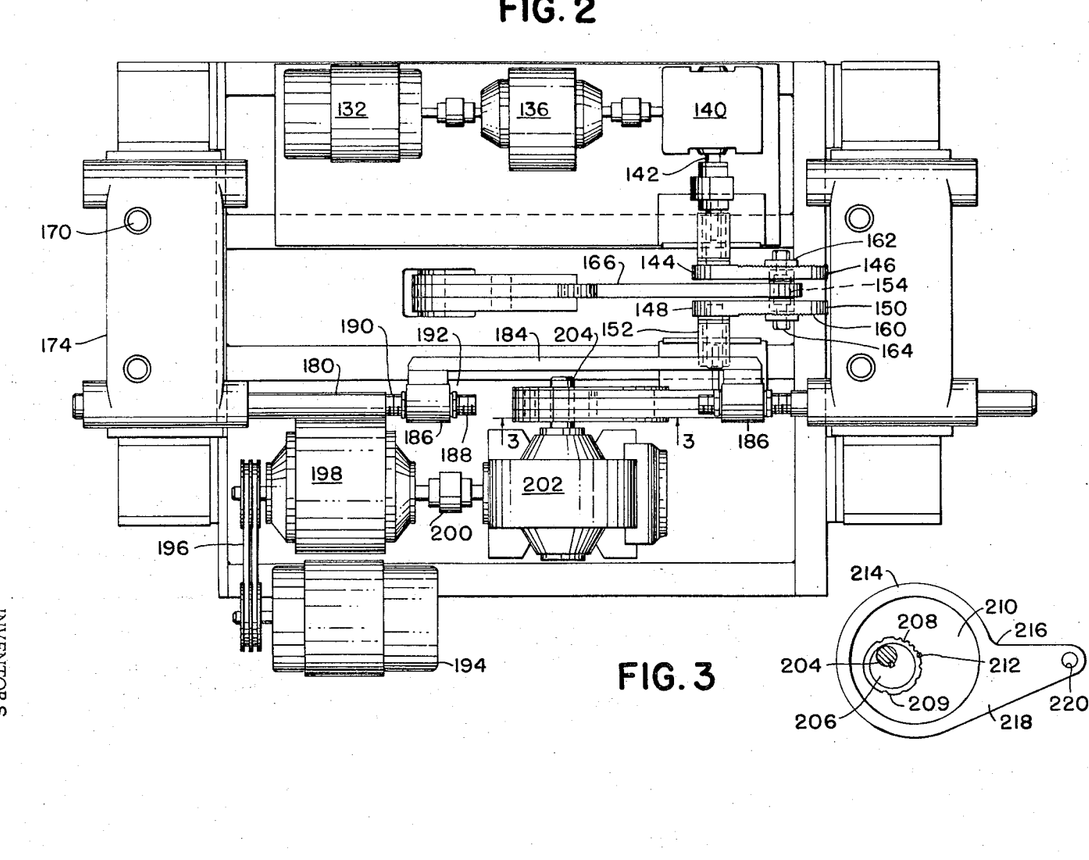
FIGURE 2 is a plan view of a fully engineered embodiment of the transfer apparatus.
FIGURE 3 is a fragmentary sectional view on the line 3—3, FIGURE 2.
Figure 5:
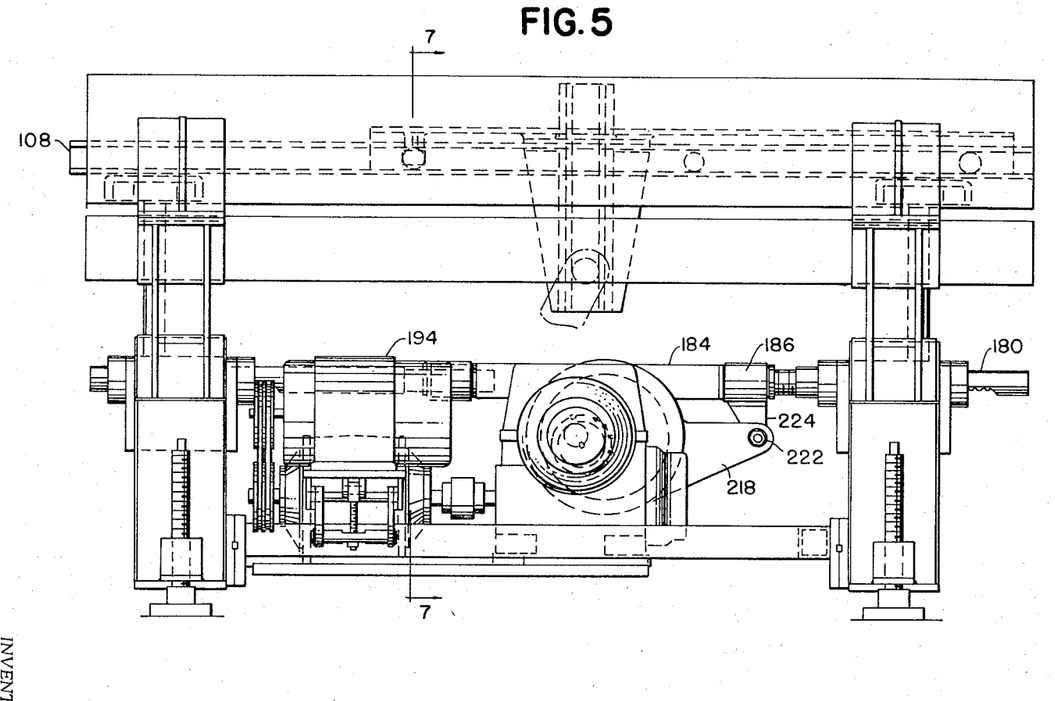
FIGURE 5 is a side elevational view showing particularly the mechanism for effecting vertical movement.

As best seen in FIGURES 2, 3, and 5, the drive means for effecting vertical movement of the platform comprises a motor 194 connected by pulleys and drive belts 196 to a combined clutch and brake unit 198 which may be similar to the unit 136 previously described. The unit 198 is connected by a coupling 200 to a speed reducer 202 having an output shaft 204. As best seen in FIGURE 3, the output shaft 204 has keyed or otherwise secured thereto an eccentric disc 206 having around a portion of its periphery a series of recesses 208 of semi-circular cross-section. The disc 206 is rotatably received in a circular opening 209 located eccentrically in a larger disc 210. The circular opening 209 is provided with a recess of semi-circular cross-section. From the foregoing it will be apparent that the eccentricity of the disc 210 with reference to the drive shaft 204 may be varied by rotating the disc 206 in the opening 209 to a desired position and then interlocking the two discs by inserting a pin 212 in the recess in the opening 209 and a selected one of the recesses 208 in the disc 206.

The eccentric disc 210 is received in a sleeve portion 214 of a driving coupling 216 having an arm 218 provided with an opening 220. As best seen in FIGURE 5, the arm 218 is connected by pivotal drive means 222 to a depending bracket 224 provided on one of the sleeve portions 186.

From the foregoing it will of course be apparent that while the motor 194 rotates, the eccentric drive mechanism reciprocates the racks 180 back and forth longitudinally of the apparatus, and by means of the mechanism previously described, this results in vertical movement of the platform 108. Since the drive is by an eccentric mechanism rotatable through 360 degrees, the vertical movement of the platform 108 is derived from a simple harmonic motion.

It will be understood that since the platform and slide are each reciprocated by mechanism which includes a crank rotated at uniform velocity, the motion of the platform and slide is essentially harmonic in character. Harmonic motion is defined as the projection on any diameter of uniform rotation in a circle, or as reciprocation of constant amplitude in which the acceleration is proportional and oppositely directed to displacement of the body from a point of equilibrium. Thus, if the crank pin of one of the actuating cranks operated directly in a slot of the platform or slide reciprocated thereby, the motion would be true or simple harmonic motion. However, rotation of the crank is converted to straight line reciprocation through the medium of links and accordingly, the reciprocation is not purely a simple harmonic motion. It is however, essentially harmonic in character in that at each end of the stroke deceleration and acceleration respectively decrease and increase gradually with maximum velocity occurring close to the mid-point of the stroke. Accordingly, this reciprocatory motion is referred to herein as harmonic or essentially harmonic in character.

Means are provided for effecting essentially 180 degrees rotation of the drive shafts 142 and 204 and to terminate rotation thereof upon completion of 180 degrees rotation. Moreover, termination and initation of rotation of each of these drive shafts occurs when the platform is at the upper or lower limit of its movement and when the slide 110 is at either extreme position longitudinally of the machine.

Figure 11:
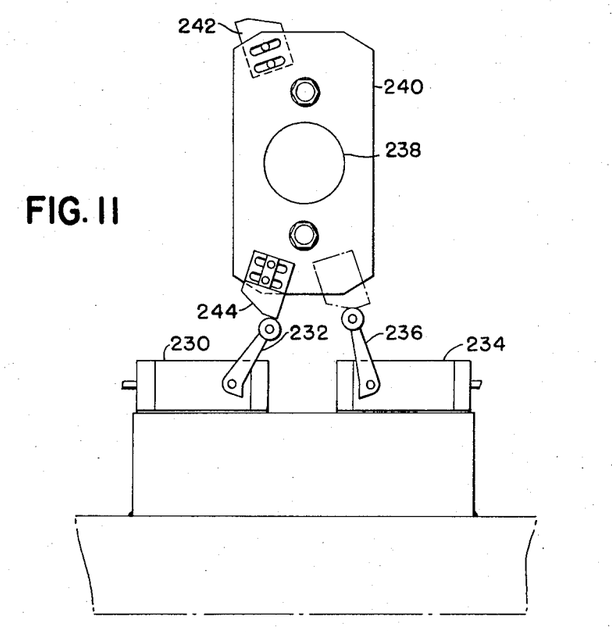
FIGURES 11 and 12 are elevational views showing limit switches for controlling the operation of the clutch-brake units.

Referring now to FIGURE 11 there is shown a limit switch 230 having an actuating arm 232, and a limit switch 234 having an actuating arm 236. A shaft is illustrated at 238 in this figure which may be the shaft 204 or a shaft rotatable in timed relation thereto. Secured to the shaft is a plate 240 having adjustable dogs 242 and 244 thereon. The dogs are located at opposite sides of the plate 240 as shown, and each is adapted to engage rollers at the ends of one of the arms 232 and 236. Specifically, the dog 244 is illustrated as associated with the limit switch 230. The dogs 242 and 244 are spaced apart a distance such that 180 degrees' rotation of the shaft 238 will effect actuation of one of the limit switches.

Figure 12:
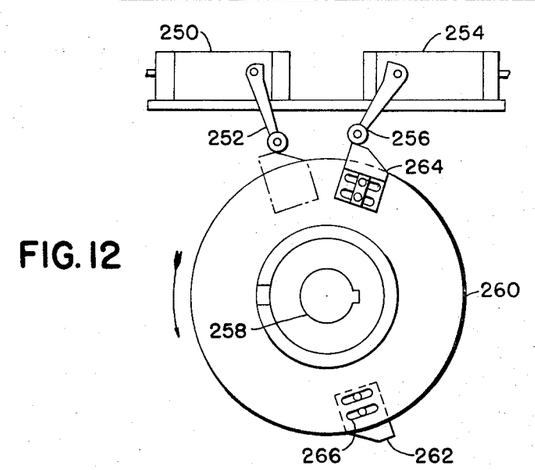

Referring to FIGURE 12, there is shown a similar arrangement in which a limit switch 250 is provided with an actuating arm 252 and a limit switch 254 is provided with an actuating arm 256. Secured to the shaft illustrated in this figure as 258 but which may be the shaft 142 or any shaft rotatable in synchronism therewith, is a plate 260 having adjustable dogs 262 and 264 provided thereon. Adjustment of the dogs is provided by elongated mounting openings indicated at 266. The dogs are arranged such that the 180 degrees' rotation from a position in which one of the dogs engages its associated switch actuating arm will result in actuation of the other switch.

The apparatus is intended to advance a series of articles such for example as automobile bumpers, to a press or the like and at the beginning of a cycle the platform is in lower position and the slide is in retracted position. Completion of a press operation results in supplying a signal which engages the clutch and releases the brake of the unit 198, thus initiating vertically upward movement of the platform. After 180 degrees of rotation of the platform or plate 240 limit switch 230 is actuated which results in disengagement of the clutch and application of the brake in the unit 198 and which also actuates unit 136 to effect engagement of its clutch and release of its brake. This starts horizontal movement of the slide from its retracted position towards its extended position and after 180 degrees' rotation of the disc 260 the dog 264 will engage the actuating lever arm 256 operating limit switch 254, which will result in disengagement of the clutch and application of the brake in the unit 136, thus terminating horizontal movement of the slide in its extended position and actuation of the limit switch 254 again causes engagement of the clutch and release of the brake in unit 198 which effects vertically downward movement of the platform accompanied by 180 degrees' rotation of the plate 240. At the bottom of the downward movement of the platform dog 242 engages arm 236 of limit switch 234, which disengages the clutch and applies the brake of unit 198 and at the same time engages the clutch and releases the brake of unit 136, thus initiating the return stroke of the slide. This is accompanied by 180 degrees of rotation of the plate or disc 260 and when the slide is fully retracted dog 262 engages the arm 252 of limit switch 250 which results in disengagement of the clutch and application of the brake in unit 136, completing a cycle. The following cycle is initiated by a signal derived from the press or other station to which the apparatus transfers work pieces.

The drawings and the foregoing specification constitute a description of the improved transfer apparatus in such full, clear, concise and exact terms as to enable any person skilled in the art to practice the invention the scope of which is indicated by the appended claims.

What we claim as our invention is:

1. Transfer apparatus comprising a frame, a platform movable vertically on said frame, a slide movable vertically with and horizontally on said platform, vertical drive mechanism for effecting vertical movement of said platform and slide on said frame, and horizontal drive mechanism for effecting horizontal movement of said slide on said platform in which one of said drive mechanisms effects essentially harmonic motion of the structure driven thereby.

2. Apparatus as defined in claim 1 in which both of said mechanisms effect essentially harmonic motion of the structure driven thereby.

3. Apparatus as defined in claim 2 comprising means responsive to predetermined movement of said platform for initiating movement of said slide on said platform.

4. Apparatus as defined in claim 2 comprising means responsive to predetermined movement of said slide on said platform to initiate movement of said platform.

5. Apparatus as defined in claim 2 comprising means responsive to predetermined movement of said platform for initiating movement of said slide on said platform, and means responsive to completion of movement of said platform in one direction to arrest further movement of said platform.

6. Apparatus as defined in claim 2 comprising means responsive to predetermined movement of said slide on said platform to initiate movement of said platform, and means responsive to completion of movement of said slide on said platform in one direction to arrest movement thereof.

7. Apparatus as defined in claim 2 comprising means responsive to predetermined movement of said platform for initiating movement of said slide on said platform, means responsive to predetermined movement of said slide on said platform to initiate movement of said platform, means responsive to completion of movement of said platform in one direction to arrest further movement of said platform, and means responsive to completion of movement of said slide on said platform in one direction to arrest movement thereof.

8. Apparatus as defined in claim 1 in which both of said drive mechanisms comprise rotary drive means rotatable through 360 degrees to effect a back and forth essentially harmonic movement of the structure driven thereby, and means to interrupt operation of each of said drive mechanisms at the point of reversal thereof.

9. Apparatus as defined in claim 8 which comprises control means responsive to predetermined movement of each of said rotary drive means for initiating rotation of the other.

10. Apparatus as defined in claim 9 in which the control means comprises adjustable switches and switch actuators.

11. Apparatus as defined in claim 1 in which the vertical drive mechanism comprises an elongated rod reciprocable longitudinally of said frame, cross shafts at opposite ends of said frame, pinions fixed to said cross shafts, rack sections on said rod, four vertical posts on said frame, rack sections on each of said posts, and a pair of pinions in each of said cross shafts in mesh with the rack sections on the pair of posts adjacent thereto.

12. Apparatus as defined in claim 1 in which the vertical drive mechanism comprises a rotary drive shaft, an eccentric on said shaft, a second eccentric angularly adjustable relative to said first eccentric, and a link having a circular opening in which said second eccentric is rotatable.

13. Apparatus as defined in claim 12, and longitudinally adjustable rack sections connected to said link for reciprocation thereby.

14. Apparatus as defined in claim 1 in which the horizontal drive mechanism comprises a bracket on said slide having a vertical slot therein, a lever pivoted at its lower end to said frame, a pin at the opposite end of said lever slidable in said slot, a crank, and a link connecting said crank to said lever.

15. Apparatus as defined in claim 14, said link having pivot means connecting it to said lever which is adjustable longitudinally of said lever.

16. Apparatus as defined in claim 14, said crank having pivot means connecting it to said link which is adjustable to vary the throw of said crank.

17. Transfer apparatus comprising a frame, a platform movable vertically on said frame, a slide movable vertically with and horizontally on said platform, vertical essentially harmonically operable drive means for effecting vertical movement of said platform from a stationary first positon at gradually increasing and thereafter gradually decreasing velocity to a second stationary position spaced vertically from said first position, and horizontally essentially harmonically operable drive means for effecting horizontal movement of said slide from a stationary first position at gradually increasing and thereafter gradually decreasing velocity to a second stationary position spaced horizontally from said first position, continuously and unidirectionally operating motor means, and means for selectively coupling said motor means alternately to said vertical and horizontal drive means.

18. Transfer apparatus as defined in claim 17 in which the means for selectively coupling said motor means to said drive means includes rotating cranks or the equivalent thereof, and means for terminating rotation of said cranks after 180 degrees' rotation thereof at a point in their rotation in which they are producing substantially zero movement of the driven apparatus connected thereto.

References Cited
UNITED STATES PATENTS

| | | | |
|---|---|---|---|
| 2,897,713 | 8/1959 | Darigo | 198—219 |
| 2,915,204 | 12/1959 | Alimanestiano | 198—219 |
| 2,945,602 | 7/1960 | Kroll et al. | 214—16.14 |
| 3,063,579 | 11/1962 | Alimanestiano | 214—16.14 |
| 3,161,284 | 12/1964 | Ashworth | 198—219 |
| 3,184,031 | 5/1965 | Dunlap | 214—1 |
| 3,193,088 | 7/1965 | White | 198—219 |
| 3,212,649 | 10/1965 | Johnson et al. | 74—110 |

FRED C. MATTERN, JR., *Primary Examiner.*

W. S. RATLIFF, *Assistant Examiner.*